US012643608B1

(12) United States Patent
Barman et al.

(10) Patent No.: US 12,643,608 B1
(45) Date of Patent: Jun. 2, 2026

(54) BRACE CAP FOR MANAGING FRONTAL CRASH ENERGY IN A FRONT CRADLE OF A VEHICLE

(71) Applicant: GM Global Technology Operations LLC, Detroit, MI (US)

(72) Inventors: Amlanjyoti Barman, Troy, MI (US); Rodrigo de Paula Ferrante, Lake Orion, MI (US); Ron Jack Dean Taulbee, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/275,292

(22) Filed: Jul. 21, 2025

(51) Int. Cl.
*B62D 21/15* (2006.01)
*B60R 19/03* (2006.01)
*B60R 19/24* (2006.01)
*B62D 65/16* (2006.01)

(52) U.S. Cl.
CPC ............ *B62D 21/155* (2013.01); *B60R 19/03* (2013.01); *B60R 19/24* (2013.01); *B62D 65/16* (2013.01)

(58) Field of Classification Search
CPC .................................................. B62D 21/155
See application file for complete search history.

(56) References Cited

U.S. PATENT DOCUMENTS

| | | | | |
|---|---|---|---|---|
| 4,830,417 A | * | 5/1989 | Bates | B60R 19/26 |
| | | | | 267/116 |
| 5,005,887 A | * | 4/1991 | Kelman | B60R 19/22 |
| | | | | 293/109 |

| | | | | |
|---|---|---|---|---|
| 5,862,877 A | * | 1/1999 | Horton | B60G 99/004 |
| | | | | 280/798 |
| 6,361,244 B1 | * | 3/2002 | Ni | B62D 23/005 |
| | | | | 403/345 |
| 9,308,940 B1 | * | 4/2016 | Malavalli | B62D 25/082 |
| 9,376,073 B2 | * | 6/2016 | Gupta | A61M 25/02 |
| 9,376,144 B2 | * | 6/2016 | Shaner | B62D 21/152 |
| 11,643,144 B2 | * | 5/2023 | Malm | B62D 21/155 |
| | | | | 280/784 |
| 12,134,426 B1 | * | 11/2024 | Pinsonneault | B60K 1/04 |

(Continued)

FOREIGN PATENT DOCUMENTS

| | | | | | |
|---|---|---|---|---|---|
| CN | 110641551 B | * | 2/2022 | .......... | B62D 25/082 |
| JP | 6052408 B2 | * | 12/2016 | ............ | B62D 21/02 |

(Continued)

*Primary Examiner* — Nicole T Verley
(74) *Attorney, Agent, or Firm* — Vivacqua Crane, PLLC

(57) ABSTRACT

A plurality of brace caps for increasing strength of a front cradle for a vehicle includes a top surface defining a length and a bottom surface defining an opening. The bottom surface opposes the top surface. The opening extends from the bottom surface towards the top surface. The front cradle attaches to the opening. The front cradle includes a diagonal cradle brace, a cradle rail, a diagonal brace connection bar, a drive unit attachment bar, and a cradle bar. The diagonal cradle brace has a first end and a second end. One of the plurality of brace caps attaches to the first end. A different one of the plurality of brace caps attaches to the second end. The plurality of brace caps further includes an inboard surface and an outboard surface opposing the inboard surface. The inboard surface and the outboard surface connect the bottom surface to the top surface.

20 Claims, 3 Drawing Sheets

(56)  References Cited

U.S. PATENT DOCUMENTS

| | | | | |
|---|---|---|---|---|
| 2013/0081897 A1* | 4/2013 | Dandekar | ........... | B62D 21/155 |
| | | | | 180/291 |
| 2013/0249243 A1* | 9/2013 | Lee | ...................... | B62D 25/082 |
| | | | | 296/187.11 |
| 2014/0191105 A1* | 7/2014 | Dandekar | ................ | B60K 5/12 |
| | | | | 248/671 |
| 2014/0265441 A1* | 9/2014 | Ameloot | .............. | B62D 21/155 |
| | | | | 296/187.1 |
| 2014/0333091 A1* | 11/2014 | Stockard | ................ | F16F 7/125 |
| | | | | 296/187.03 |
| 2017/0274934 A1* | 9/2017 | Elliott | .................. | B62D 21/155 |
| 2022/0410976 A1* | 12/2022 | Malm | ................... | B62D 21/11 |

FOREIGN PATENT DOCUMENTS

| | | | | | |
|---|---|---|---|---|---|
| WO | WO-2014066275 A1 * | 5/2014 | ........... | B62D 21/155 |
| WO | WO-2014097398 A1 * | 6/2014 | ............. | B60R 19/34 |
| WO | WO-2014141931 A1 * | 9/2014 | ........... | B62D 25/082 |

* cited by examiner

BRACE CAP FOR MANAGING FRONTAL CRASH ENERGY IN A FRONT CRADLE OF A VEHICLE

INTRODUCTION

The present disclosure relates to a brace cap for a front cradle. More specifically, the present disclosure relates to a brace cap for managing frontal crash energy in a front cradle of a vehicle.

The front cradle of a vehicle manages frontal crash energy. In a full-frontal crash, the front cradle deforms to absorb the frontal crash energy and slows the vehicle gradually. Alternatively, during a small overlap crash, where a barrier overlaps 25% of the vehicle, the front cradle propels the vehicle laterally or in a cross-car direction. The full-frontal crash and the small overlap crash have conflicting strength requirements. The front cradle needs to be weak enough to deform, yet strong enough to propel the vehicle laterally.

Thus, while current front cradles achieve their intended purpose, there is a need for a new and improved system and method for a brace cap for managing frontal crash energy in the front cradle of the vehicle.

SUMMARY

According to several aspects, a plurality of brace caps for increasing strength of a front cradle for a vehicle is provided. The plurality of brace caps includes a top surface defining a length. The plurality of brace caps further includes a bottom surface defining an opening. The bottom surface opposes the top surface. The opening extends from the bottom surface towards the top surface. The front cradle attaches to the opening of the plurality of brace caps. The front cradle includes a diagonal cradle brace having a first end and a second end. One of the plurality of brace caps attaches to the first end. A different one of the plurality of brace caps attaches to the second end. The front cradle further includes a cradle rail connected to the diagonal cradle brace. The front cradle further includes a diagonal brace connection bar connected to the diagonal cradle brace. The front cradle further includes a drive unit attachment bar connected to the cradle rail. The front cradle further includes a cradle bar attaching the front cradle to the vehicle. The plurality of brace caps further includes an inboard surface connecting the bottom surface to the top surface. The plurality of brace caps further includes an outboard surface opposing the inboard surface and connecting the bottom surface to the top surface.

In an additional aspect of the present disclosure, the outboard surface having an upper portion and a lower portion. The upper portion extends towards the top surface at an angle. The angle adjusts the length of the top surface.

In another aspect of the present disclosure, the opening of the bottom surface matches a contour of the diagonal cradle brace.

In another aspect of the present disclosure, the plurality of brace caps is formed by one of the following: steel stamping, aluminum extrusion, and aluminum casting.

In another aspect of the present disclosure, the plurality of brace caps is composed of aluminum.

In another aspect of the present disclosure, the plurality of brace caps is attached to the front cradle by at least one of: welding or bolting.

According to several aspects, a method for increasing strength of a front cradle for a vehicle is provided. The method includes creating a plurality of brace caps for the front cradle. The front cradle includes a diagonal cradle brace having a first end and a second end. The front cradle further includes a cradle rail connected to the diagonal cradle brace. The front cradle further includes a diagonal brace connection bar connected to the diagonal cradle brace. The front cradle further includes a drive unit attachment bar connected to the cradle rail. The front cradle further includes a cradle bar attaching the front cradle to the vehicle. The method further includes attaching one of the plurality of brace caps to the first end of the diagonal cradle brace. The plurality of brace caps includes a top surface defining a length. The plurality of brace caps further includes a bottom surface defining an opening. The bottom surface opposes the top surface. The opening extends from the bottom surface towards the top surface. The plurality of brace caps further includes an inboard surface connecting the bottom surface to the top surface. The plurality of brace caps further includes an outboard surface opposing the inboard surface and connecting the bottom surface to the top surface. The method further includes attaching a different one of the plurality of brace caps to the second end of the diagonal cradle brace.

In another aspect of the present disclosure, the method further includes a barrier colliding with the vehicle, creating a barrier overlap.

In another aspect of the present disclosure, the barrier overlap is 25% of the vehicle.

In another aspect of the present disclosure, the barrier overlap is 105 millimeters (mm) of the front cradle.

In another aspect of the present disclosure, the outboard surface having an upper portion and a lower portion. The upper portion extends towards the top surface at an angle. The angle adjusts the length of the top surface.

In another aspect of the present disclosure, the adjusted length of the top surface causes the barrier to impact 105 millimeters (mm) of the front cradle.

In another aspect of the present disclosure, creating the plurality of brace caps from one of the following: steel stamping, aluminum extrusion, and aluminum casting.

In another aspect of the present disclosure, the plurality of brace caps is composed of aluminum.

In another aspect of the present disclosure, attaching the plurality of brace caps to the front cradle by welding.

In another aspect of the present disclosure, attaching the plurality of brace caps to the front cradle by bolting.

In another aspect of the present disclosure, the opening matches a contour of the diagonal cradle brace.

According to several aspects, a method for increasing strength of a front cradle for a vehicle is provided. The method includes creating a plurality of brace caps for the front cradle. The front cradle provides structural strength when a barrier overlaps 25% of the vehicle. The front cradle includes a diagonal cradle brace having a first end and a second end. The front cradle further includes a cradle rail connected to the diagonal cradle brace. The front cradle further includes a diagonal brace connection bar connected to the diagonal cradle brace. The front cradle further includes a drive unit attachment bar connected to the cradle rail. The front cradle further includes a cradle bar attaching the front cradle to the vehicle. The method further includes attaching one of the plurality of brace caps to the first end. The plurality of brace caps includes a top surface defining a length. The length causing a barrier overlap of 105 millimeters (mm) of the cradle. The plurality of brace caps further includes a bottom surface defining an opening. The bottom surface opposes the top surface. The opening extends from the bottom surface towards the top surface. The plurality of brace caps further includes an inboard surface connecting the bottom surface to the top surface. The plurality of brace caps further includes an outboard surface opposing the inboard surface and connecting the bottom surface to the top surface. The outboard surface extends from the bottom surface towards the top surface at an angle. The angle adjusts the length of the top surface. The method further includes attaching a different one of the plurality of brace caps to the second end.

In another aspect of the present disclosure, attaching the plurality of brace caps to the front cradle by welding.

In another aspect of the present disclosure, attaching the plurality of brace caps to the front cradle by bolting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
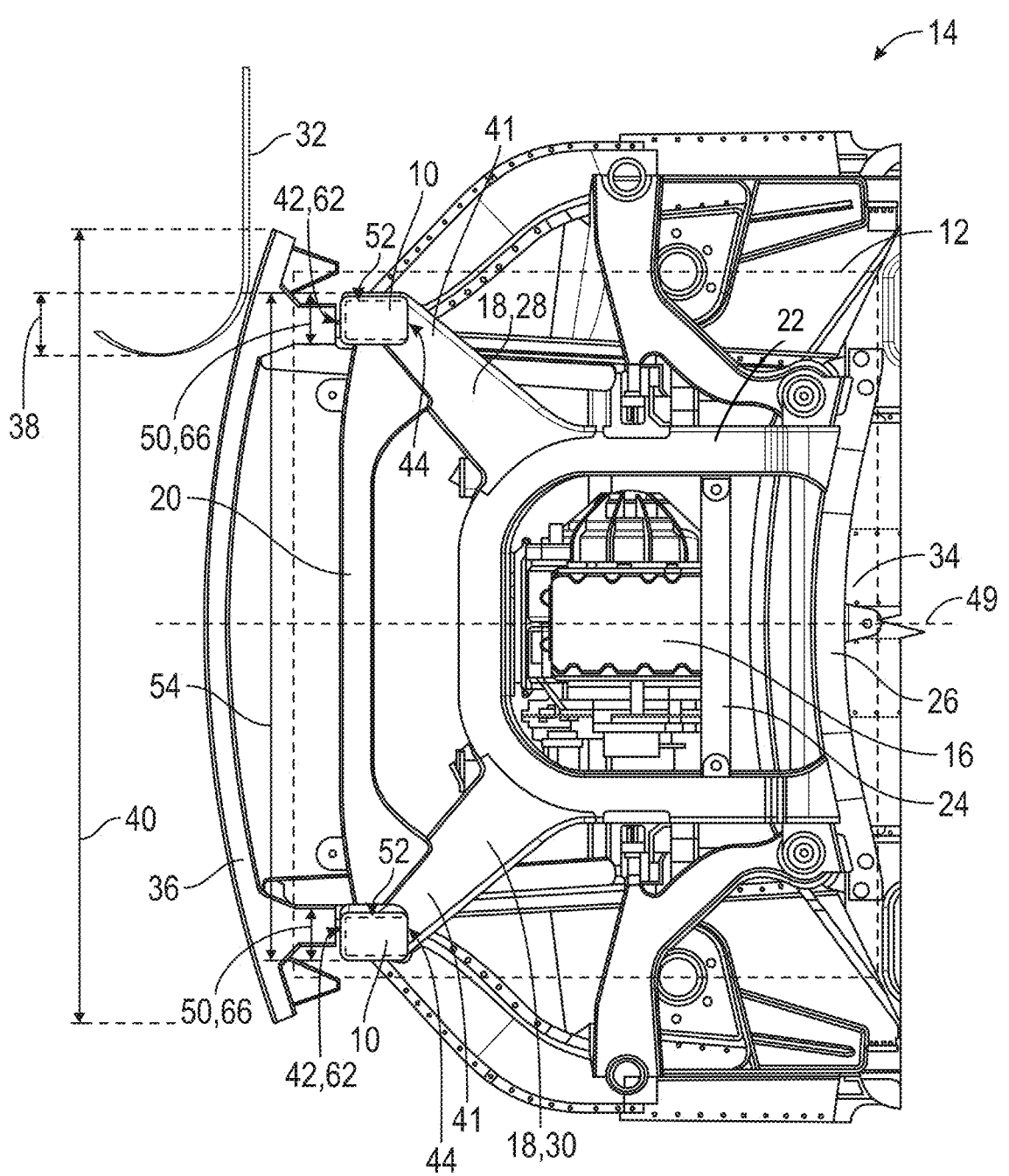
FIG. 1 is a bottom view of a plurality of brace caps for a front cradle of a vehicle according to an exemplary embodiment.

Referring to FIG. 1, a bottom view of a plurality of brace caps 10 for a front cradle 12 of a vehicle 14 is illustrated. The front cradle 12 carries a drive unit 16 of the vehicle 14. The plurality of brace caps 10 may be attached to the front cradle 12 by welding or molding, providing protection to the drive unit 16 while the vehicle 14 undergoes a frontal crash. It is to be appreciated that FIG. 1 is merely exemplary in nature and the vehicle 14 may be any type of vehicle such as, but not limited to, a sedan, a truck, a sport utility vehicle, a van, or a motor home.

The front cradle 12 includes a diagonal cradle brace 18, a diagonal brace connection bar 20, a cradle rail 22, a drive unit attachment bar 24, and a cradle bar 26. Each portion of the front cradle 12 may be, but not limited to, formed by steel stamping operations, aluminum extrusion operations, or aluminum casting. Additionally, each portion of the front cradle 12 may be, but is not limited to, composed of aluminum.

The diagonal cradle brace 18 has a first end 28 and a second end 30. The first end 28 and the second end 30 may be attached to the plurality of brace caps 10 by welding or bolting. The plurality of brace caps 10 is described in further detail below. The diagonal brace connection bar 20 may attach to the first end 28 and to the second end 30 by welding. The diagonal brace connection bar 20 provides strength across the front cradle 12 by connecting the first end 28 to the second end 30. For example, if a barrier 32 collides with the first end 28 of the diagonal brace the second end 30 helps absorb and resist the force experienced on the first end 28.

The cradle rail 22 may attach to the diagonal cradle brace 18 by welding. The cradle rail 22 creates a weaker point of the front cradle 12. By creating the weaker point, the cradle rail 22 bends at a V-shape during a full-frontal collision. The V-shape bend absorbs energy to gradually slow the vehicle 14. The drive unit attachment bar 24 may attach to the cradle rail 22 by welding. The drive unit attachment bar 24 carries the drive unit 16 and provides rigidity to the front cradle 12, helping the front cradle 12 resist bending or twisting under a load.

The cradle bar 26 may be mounted to a body rocker 34 of the vehicle 14. The cradle bar 26 creates a back structure for the front cradle 12 and transfers loads to the body rocker 34. By transferring the load, the cradle bar 26 provides the front cradle 12 with more torsional stiffness and load-baring capacity.

The front cradle 12 helps absorb energy while the vehicle 14 undergoes a frontal crash. The frontal crash occurs when the barrier 32 is in contact with a front portion 36 of the vehicle 14, creating a barrier overlap 38. The frontal crash may be a full-frontal crash, where the barrier overlap 38 is about 80% to 100% of a width 40 of the front portion 36 of the vehicle 14. In this context, the term "about" is known to those skilled in the art. Alternatively, the term "about" may be read to mean plus or minus 5%. During the full-frontal crash, the front cradle 12 absorbs energy to slow the vehicle 14 gradually by deforming. The plurality of brace caps 10 increases strength of a diagonal brace tip 41 of the front cradle 12, causing the front cradle 12 to bend at the weaker point of the cradle rail 22, creating a V-shape bend.

Alternatively, the frontal crash may be a small overlap crash, where the barrier overlap 38 about 25% of the width 40 of the front portion 36 of the vehicle 14. In this context, the term "about" is known to those skilled in the art. Alternatively, the term "about" may be read to mean plus or minus 5%. During the small overlap crash, the plurality of brace caps 10 increases the strength of the diagonal brace tip 41 of the front cradle 12, causing the front cradle 12 to push the vehicle 14 laterally. It should be appreciated that FIG. 1 is merely exemplary in nature and the barrier 32 may be any type of barrier such as, but not limited to, a different vehicle, a tree, a road sign, or a telephone pole.

One of the plurality of brace caps 10 is attached to the first end 28 of the diagonal cradle brace 18. A different one of the plurality of brace caps 10 is attached to the second end 30 of the diagonal cradle brace 18. Attaching one of the plurality of brace caps 10 to the first end 28 and a different one of the plurality of brace caps 10 to the second end, increases the strength of the front cradle 12 to create a V-shaped bend in a full-frontal crash and push the vehicle 14 laterally or in a cross-car direction in a small overlap crash.

Figures 2A, 2B:
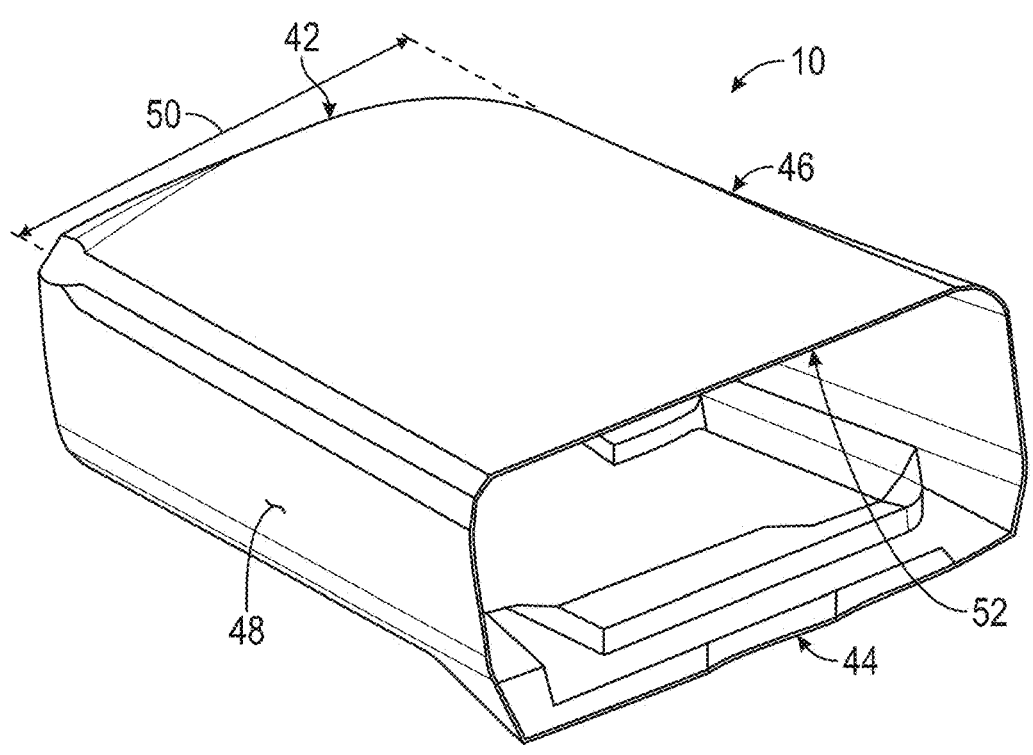
FIG. 2A is an enlarged isometric view of one of the plurality of brace caps according to an exemplary embodiment.
FIG. 2B is an enlarged top view of one of the plurality of brace caps according to an exemplary embodiment.

Referring to FIGS. 2A and 2B, an enlarged view of one of the plurality of brace caps 10 is illustrated. It should be appreciated that each of the plurality of brace caps 10 are identical, and therefore, only one of the plurality of brace caps 10 will be described herein. The brace cap 10 may be composed of aluminum and may be formed by steel stamping operations, aluminum extrusion operations, or aluminum casting. The brace cap 10 includes a top surface 42, a bottom surface 44, an inboard surface 46, and an outboard surface 48.

The top surface 42 opposes the bottom surface 44 and defines a length 50. The bottom surface 44 defines an opening 52 that extends from the bottom surface 44 towards the top surface 42. The inboard surface 46 opposes the outboard surface 48 and is positioned closer to a central axis 49 (shown in FIG. 1) of the vehicle 14 than the outboard surface 48. The inboard surface 46 and the outboard surface 48 extends from the top surface 42 to the bottom surface 44. The length 50 of the top surface 42 extends from the inboard surface 46 to the outboard surface 48. The length 50 is described in further detail below.

Referring back to FIG. 1, the opening 52 of the brace cap 10 attaches to the front cradle 12 by, but not limited to, bolting or welding. When the brace cap 10 is attached to the front cradle 12, the opening 52 of the brace cap 10 surrounds the first end 28 and the second end 30 of the diagonal cradle brace 18. The opening 52 of the bottom surface 44 matches the contour of the diagonal cradle brace 18. In the event of a small overlap crash, the length 50 of the top surface 42 enables about 105 millimeters (mm) of the front cradle 12 to engage with the barrier 32. In this context, the term "about" is known to those skilled in the art. Alternatively, the term "about" may be read to mean plus or minus 5 mm. Depending on the shape of the front cradle 12 and the width 40 of the vehicle 14, the length 50 of the top surface 42 may be adjusted to have about 105 mm of the front cradle 12 engage with the barrier 32.

For example, a first vehicle and a second vehicle may have different widths 40 of the front portion 36. The front cradle 12 may be attached to both the first vehicle and the second vehicle. If the second vehicle has a larger width than the first vehicle, 105 mm of the front cradle 12 may not sufficiently engage with the barrier 32 during a frontal crash. To have the front cradle 12 sufficiently engage with the barrier 32, the length 50 of the brace cap 10 may be adjusted prior to attaching the brace cap 10 to the front cradle 12. Adjusting the length 50 of the brace cap 10 increases a cradle width 54 allowing the front cradle 12 to be attached to different vehicle types while maintaining sufficient engagement with the barrier 32 during a frontal crash.

Figure 3A:
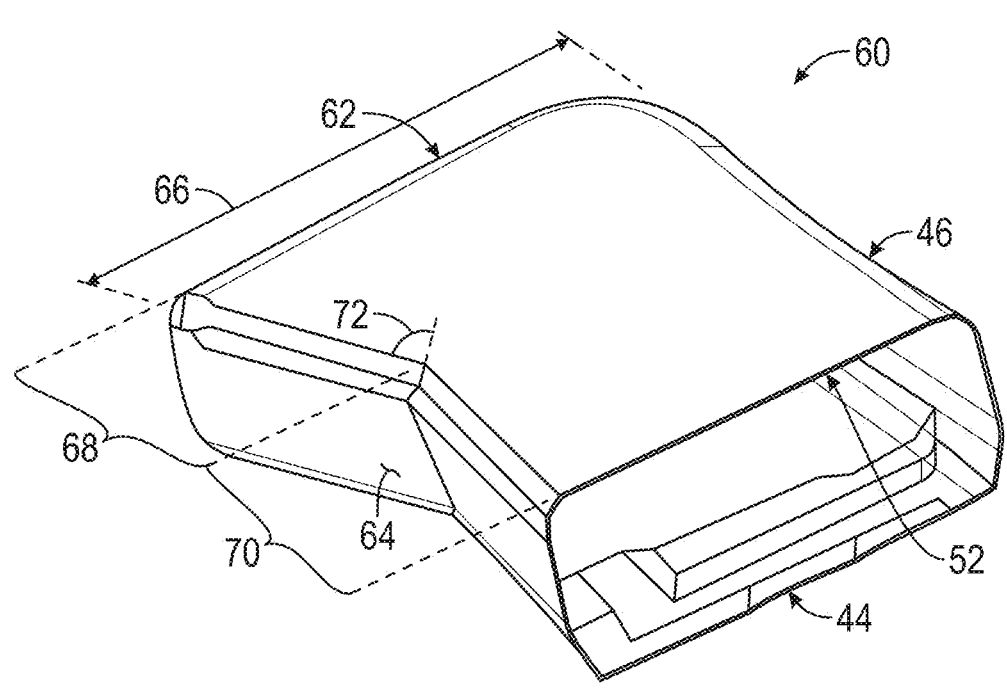
FIG. 3A is an enlarged isometric view of an alternate brace cap according to an exemplary embodiment.
Figure 3B:
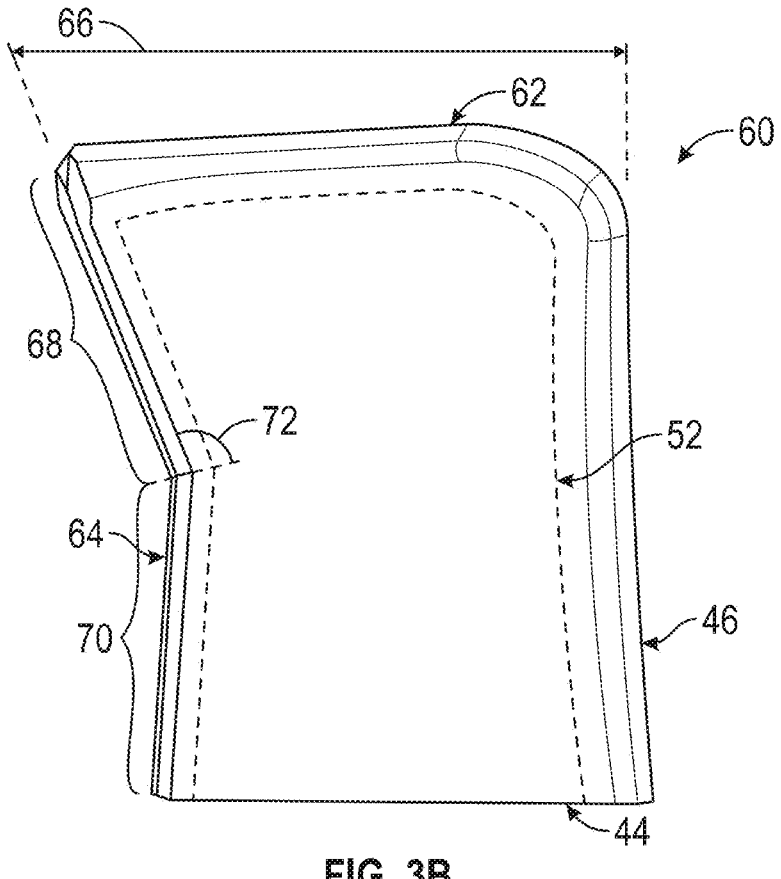
FIG. 3B is an enlarged bottom view of the alternate brace cap according to an exemplary embodiment.

Referring to FIGS. 3A and 3B, an enlarged view of an alternate brace cap 10, indicated by reference number 60, is illustrated. The brace cap 60 is similar to the brace cap 10. The brace cap 60 includes the bottom surface 44, the inboard surface 46, and the opening 52. The brace cap 60 further includes a top surface 62 and an outboard surface 64.

The top surface 62 opposes the bottom surface 44 and defines a length 66 extending from the inboard surface 46 to the outboard surface 64. The outboard surface 64 opposes the inboard surface 46 and is positioned further from the central axis 49 (shown in FIG. 1). The outboard surface 64 extends from the bottom surface 44 to the top surface 62. The outboard surface 64 has an upper portion 68 and a lower portion 70, creating an angle 72. The angle 72 adjusts the length 66 of the top surface 62.

Referring to FIGS. 1 and 3B, the angle 72 is determined based on the width 40 of the vehicle 14. For example, when the width 40 of vehicle 14 is wider, the angle 72 increases to increase the length 66 of the top surface 62. Alternatively, when the width 40 of the vehicle 14 is narrower, the angle 72 decreases to decrease the length 66 of the top surface 62. The angle 72 is determined based on the width 40 of the front portion 36 of the vehicle 14. The angle 72 may increase or decrease the length 66, causing the barrier 32 to engage with about 105 mm of the front cradle 12 during a small overlap crash. By determining the angle 72 based on the width 40 of the vehicle 14, the front cradle 12 may be utilized in different types of vehicles without adjusting the design of the front cradle 12. In addition, the angle 72 enables about 105 mm of the front cradle 12 to be engaged with the barrier 32, increasing the strength of the front cradle 12.

The brace cap 10 and 60 of the present disclosure offers several advantages. These include absorbing energy during a frontal crash by increasing the strength of the diagonal cradle brace 18. The increased strength enables the front cradle 12 to propel the vehicle latterly or in a cross-car direction during a small overlap crash. Additionally, the increased strength at the diagonal cradle brace 18 enables the front cradle 12 to make a V-shaped bend at the weaker point of the cradle rail 22 during a full-frontal crash.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An assembly for a vehicle, the assembly comprising:
    a plurality of brace caps each including:
        a top surface defining a length;
        a bottom surface defining an opening, wherein the bottom surface opposes the top surface, wherein the opening extends from the bottom surface towards the top surface; and
    a front cradle including:
        a diagonal cradle brace having a first end and a second end, wherein one of the plurality of brace caps attaches to the first end, and wherein a different one of the plurality of brace caps attaches to the second end;
        a cradle rail connected to the diagonal cradle brace;
        a diagonal brace connection bar connected to the diagonal cradle brace;
        a drive unit attachment bar connected to the cradle rail; and
        a cradle bar attaching the front cradle to the vehicle;
        an inboard surface connecting the bottom surface to the top surface; and
        an outboard surface opposing the inboard surface and connecting the bottom surface to the top surface.

2. The assembly of claim 1, wherein the outboard surface having an upper portion and a lower portion, wherein the upper portion extends towards the top surface at an angle, and wherein the angle adjusts the length of the top surface.

3. The assembly of claim 1, wherein the opening of the bottom surface matches a contour of the diagonal cradle brace.

4. The assembly of claim 1, wherein the plurality of brace caps is formed by one of the following: steel stamping, aluminum extrusion, and aluminum casting.

5. The assembly of claim 1, wherein the plurality of brace caps is composed of aluminum.

6. The assembly of claim 1, wherein the plurality of brace caps is attached to the front cradle by at least one of: welding or bolting.

7. A method for increasing strength of a front cradle for a vehicle, the method comprising:
    creating a plurality of brace caps for the front cradle, the front cradle including:
        a diagonal cradle brace having a first end and a second end;
        a cradle rail connected to the diagonal cradle brace;

a diagonal brace connection bar connected to the diago-
nal cradle brace;

a drive unit attachment bar connected to the cradle rail;
and a cradle bar attaching the front cradle to the vehicle;
attaching one of the plurality of brace caps to the first end
of the diagonal cradle brace, the plurality of brace caps
including:

a top surface defining a length;

a bottom surface defining an opening, wherein the
bottom surface opposes the top surface, and wherein
the opening extends from the bottom surface towards
the top surface;

an inboard surface connecting the bottom surface to the
top surface; and an outboard surface opposing the inboard surface and
connecting the bottom surface to the top surface; and
attaching a different one of the plurality of brace caps to
the second end of the diagonal cradle brace.

8. The method of claim 7, further comprising a barrier
colliding with the vehicle, wherein creating a barrier over-
lap.

9. The method of claim 8, wherein the barrier overlap is
25% of the vehicle.

10. The method of claim 8, wherein the barrier overlap is
105 millimeters (mm) of the front cradle.

11. The method of claim 8, wherein the outboard surface
having an upper portion and a lower portion, wherein the
upper portion extends towards the top surface at an angle,
and wherein the angle adjusts the length of the top surface.

12. The method of claim 11, wherein the adjusted length
of the top surface causing the barrier to impact 105 milli-
meters (mm) of the front cradle.

13. The method of claim 7, wherein creating the plurality
of brace caps from one of the following: steel stamping,
aluminum extrusion, and aluminum casting.

14. The method of claim 7, wherein the plurality of brace
caps is composed of aluminum.

15. The method of claim 7, wherein attaching the plurality
of brace caps to the front cradle by welding.

16. The method of claim 7, wherein attaching the plurality
of brace caps to the front cradle by bolting.

17. The method of claim 7, wherein the opening matches
a contour of the diagonal cradle brace.

18. A method for increasing strength of a front cradle for
a vehicle, the method comprising:

creating a plurality of brace caps for the front cradle,
wherein the front cradle providing structural strength
when a barrier overlaps 25% of the vehicle, the front
cradle including:

a diagonal cradle brace having a first end and a second
end;

a cradle rail connected to the diagonal cradle brace;

a diagonal brace connection bar connected to the diago-
nal cradle brace;

a drive unit attachment bar connected to the cradle rail;
and a cradle bar attaching the front cradle to the vehicle;
attaching one of the plurality of brace caps to the first end,
the plurality of brace caps including:

a top surface defining a length, wherein the length
causing a barrier overlap of 105 millimeters (mm) of
the cradle;

a bottom surface defining an opening, wherein the
bottom surface opposes the top surface, and wherein
the opening extends from the bottom surface towards
the top surface;

an inboard surface connecting the bottom surface to the
top surface; and an outboard surface opposing the inboard surface and
connecting the bottom surface to the top surface,
wherein the outboard surface extends from the bot-
tom surface towards the top surface at an angle, and
wherein the angle adjusts the length of the top
surface; and attaching a different one of the plurality of brace caps to
the second end.

19. The method of claim 18, wherein attaching the plu-
rality of brace caps to the front cradle by welding.

20. The method of claim 18, wherein attaching the plu-
rality of brace caps to the front cradle by bolting.

* * * * *